United States Patent Office 3,485,579
Patented Dec. 23, 1969

3,485,579
BENEFICIATION OF CRYOLITE MATERIAL
Donald Otis Vancil and Maurice Clark Harrison, Longview, Wash., assignors to Reynolds Metals Company, Richmond, Va., a corporation of Delaware
No Drawing. Filed Nov. 22, 1966, Ser. No. 596,089
Int. Cl. *C01d 3/02; C01f 7/54*
U.S. Cl. 23—88
11 Claims

ABSTRACT OF THE DISCLOSURE

Cryolite having a weight ratio of NaF to $AlF_3$ less than 1.5, useful as an additive for alumina reduction cells, is prepared by reacting cryolite material in presence of reactive alumina with an acid reactant such as hydrochloric or sulfuric acid, or an aluminum salt thereof, the amount of acid reactant being sufficient to convert at least a portion of the reactive alumina into cryolite material comprising excess aluminum fluoride.

---

This invention relates to the beneficiation of cryolite material. More particularly, the invention concerns a method of lowering the NaF/$AlF_3$ weight ratio of cryolite material, and to the utilization of such lower ratio cryolite in the operation of alumina reduction cells.

In natural cryolite ($Na_3AlF_6$), the weight ratio of NaF to $AlF_3$ is close to 1.5 to 1. In synthetic cryolites, including those produced by off-gas recovery processes which involve reacting sodium fluoride solution and sodium aluminate solution, followed by precipitation of the cryolite by the introduction of carbon dioxide gas, the products are usually characterized by a weight ratio of NaF to $AlF_3$ much in excess of 1.5, and which may run as high as 1.9, as well as by substantial silica contamination. The hypothetical reaction for the foregoing synthesis is:

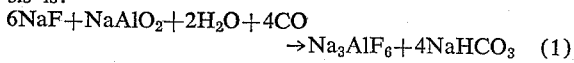
$$6NaF + NaAlO_2 + 2H_2O + 4CO_2$$
$$\rightarrow Na_3AlF_6 + 4NaHCO_3 \quad (1)$$

Such synthetic cryolite may also contain substantial amounts of alumina and sodium carbonate, sometimes in the form of Dawsonite $Al_2O_3 \cdot Na_2CO_3$, and is thus alkaline in character.

During the operation of alumina reduction cells, the molten cryolite electrolyte gradually becomes depleted in fluoride content, by vaporization of components rich in aluminum fluoride. At the same time cryolite components rich in sodium are absorbed into the carbonaceous cathode of the reduction cell. Since it is generally considered desirable to maintain the NaF to $AlF_3$ weight ratio of the electrolyte within the range of about 1.3 to 1.5 to 1 for optimum cell operation, soda ash may be added during this period to replace the excess sodium collected in the cathode, and alkaline cryolite is advantageously used for this purpose. This phase of operation will usually occur within six to twelve months after a new cell is placed in use.

For the remaining two to three years of cell life it becomes necessary periodically to add aluminum fluoride and cryolite to match the composition of the vaporization losses. Where the make-up cryolite contains excess sodium fluoride, or sodium oxide, hydroxide or carbonate values, even greater amounts of expensive aluminum fluoride must be added to preserve the ratio. Thus, during the greater part of the operating life of an alumina reduction cell, both cryolite and aluminum fluoride must be supplied to the cell, necessitating the maintenance of inventories of such compounds, and increasing the cost of operation.

It is also customary to recover fluorine values from cell waste gases, and from used pot linings and other materials employed in the cells. This is usually accomplished by employing a caustic aluminate leach liquor, followed by carbonation to precipitate synthetic cryolite. The resulting cryolite is also alkaline and of limited usefulness.

It has been proposed in the prior art to beneficiate synthetic cryolite so as to raise its fluoride content and lower its silica content by reacting the precipitated cryolite with a soluble fluoride or with hydrofluoric acid, at elevated temperature, for a period of ½ to 1½ hours, and a method of this type is described in Gernes, U.S. Patent 3,061,411. Under these conditions, however, the weight ratio of NaF to $AlF_3$ is only slightly lowered, and in any event, remains in the range of 1.65 to 1.73, or well above the value of 1.5, so that the cryolite retains its essentially alkaline character.

Accordingly, the problem of providing a cryolite having a low NaF/$AlF_3$ weight ratio, and which would be of great value as an additive to alumina reduction cells in maintaining the optimum ratio of NaF to $AlF_3$ in the electrolyte, as well as for other purposes, remained unsolved prior to the present invention.

In accordance with the present invention, there is provided a novel method whereby a cryolite material having excess sodium may be beneficiated and converted to a more desirable low ratio cryolite material, and, particularly, to a beneficiated cryolite having a weight ratio of NaF to $AlF_3$ of less than 1.5, by reacting said cryolite material in the presence of reactive alumina with at least one acid reactant such as hydrochloric, sulfuric, nitric, sulfurous or hypochlorous acid, or an aluminum salt of any such acid.

In the aluminum industry, and for purposes of this invention, the term cryolite material is employed to denote a range of materials comprising mixtures of NaF and $AlF_3$ or one or more of the double salts of NaF and $AlF_3$, which double salts may also contain uncombined NaF or $AlF_3$. The cryolite materials are usually characterized by the ratio of the total weight of NaF contained in a given quantity to the total weight of $AlF_3$ present, without regard to the presence or absence of chemical bonding between the NaF and $AlF_3$. The value of this weight ratio for naturally occurring cryolite is about 1.5, in good agreement with the weight ratio of the molecular double salt $3NaF \cdot AlF_3$. X-ray and other evidence indicates the existence of two other double salts, $5NaF \cdot 3AlF_3$ (weight ratio 0.833), and $NaF \cdot AlF_3$ (weight ratio 0.5).

It is also common in the aluminum industry to characterize cryolite materials by their "percent excess $AlF_3$" or "percent excess NaF", which terms are defined as the percent $AlF_3$ (or NaF) present in the material in excess of the amount required to form, with the NaF (or $AlF_3$) present, a cryolite of weight ratio 1.5. Thus, the double salts $5NaF \cdot 3AlF_3$ and $NaF \cdot AlF_3$ would be described as having about 24.1 and 44.5 percent excess $AlF_3$, respectively.

The cryolite material amenable to the treatment of the invention may be derived from any suitable source, including synthetic cryolite prepared as previously described, as by direct precipitation or by recovery from reduction cell waste gases, or from cell linings and electrodes. Natural (Greenland) cryolite can also have its weight ratio of NaF/$AlF_3$ lowered by the method of the invention.

The reactive alumina should be in a form which is readily attacked by the acid reactant, as for example, Bayer process alumina trihydrate, sodium aluminate, aluminum hydroxide, or the mineral Dawsonite

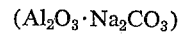
$$(Al_2O_3 \cdot Na_2CO_3)$$

which is commonly present in alkaline cryolite materials which have been precipitated by the reaction of carbon dioxide on caustic-fluoride solutions containing an excess of alumina.

Thus, for example, if it is desired to reduce the ratio of relatively pure cryolite, the appropriate amount of Dawsonite, or preferably freshly precipitated alumina trihydrate, may be added to the water slurry of the cryolite.

If desired, alumina in excess of the amount required for reaction (1) above may be added at any point in the cryolite production system where such alumina might reasonably be present, or be produced either ahead of, or in, the carbonation equipment used for reaction (1).

The acid reactants which may be employed in accordance with the invention include, for example, hydrochloric acid, sulfuric acid, sulfurous acid, hypochlorous acid ($HClO+HCl$), and nitric acid, and their aluminum salts, such as aluminum chloride, aluminum sulfate, and aluminum nitrate.

It is to be noted that the use of an aluminum salt such as aluminum chloride, for example, avoids the necessity of adding reactive alumina separately, because sufficient reactive alumina can be produced in situ by addition of sodium hydroxide or the like. Thus, the terminology "in the presence of reactive alumina" is used herein the general sense of there being provided in one way or another sufficient aluminum ions to effectuate the desired reaction to form cryolite material comprising excess aluminum fluoride.

A unique feature of the method of the invention lies in the fact that the beneficiated cryolite material is recovered as a solid, while the impurities, and particularly silica impurities, are either taken into solution or remain in solution. The beneficiated cryolite material may then be readily filtered, leaving the sodium and silica in solution.

The amount of acid reactant added is sufficient first to neutralize any excess sodium compound, and then to combine with the reactive alumina and a portion of the sodium in the initial cryolite material. X-ray analysis of the beneficiated cryolite material indicates varying amounts of chiolite ($5NaF \cdot 3AlF_3$) or aluminum fluoride (in the form of a complex hydroxyfluoride, $16Al(OHF)_3 \cdot 6H_2O$), or both. Thus, using sulfuric acid, for example, the reactions would appear to be:

$$Na_2CO_3 + H_2SO_4 \rightarrow Na_2SO_4 + H_2O + CO_2 \quad (2)$$

$$7Na_3AlF_6 + Al_2O_3 + 3H_2O_4$$
$$\rightarrow 3Na_5Al_3F_{14} + 3Na_2SO_4 + 3H_2O \quad (3)$$

$$2Na_3AlF_6 + Al_2O_3 + 3H_2SO_4$$
$$\rightarrow 4AlF_3 + 3Na_2SO_4 + 3H_2O \quad (3a)$$

The pH may drop as low as 3 or 4, depending on the rate of addition of the acid reactant, but then rises slowly during digestion as the sodium compound is neutralized and the reaction proceeds. In about 20 minutes, the pH has reached about 6.0 to 6.5, and most of the fluorine has precipitated with the cryolite material, with only a small amount appearing in the filtrate. The silica content of the resulting cryolite material is less than half that of the original material.

Similarly, when treating cryolite material having a 2.5 weight ratio of NaF to $AlF_3$, for example, to produce beneficiated cryolite of 1.0 ratio, the reaction may be as follows:

$$10(5NaF \cdot AlF_3) + 3Al_2O_3 + 9H_2SO_4$$
$$\rightarrow 16(2NaF \cdot AlF_3) + 9H_2O + 9Na_2SO_4 \quad (4)$$

It can be seen therefore, that, depending upon the amount of $Na_2CO_3$ or other excess sodium values present in the initial cryolite material, the weight proportions or reactive alumina and acid reactant can be estimated in advance. On the other hand, if sufficient reactive alumina is provided to adjust the Na:Al molar ratio of the cryolite material to the desired value less than 3:1, the reaction can be carried out effectively simply by introducing the acid reactant until stabilization of the pH indicates completion of the reaction. The proportions of acid reactant and reactive alumina can be varied as required to approach the optimum final pH of about 6.0 to 6.5. If too much acid is introduced, so that the pH falls lower than desired, this can be compensated by introducing an additional amount of cryolite material containing Dawsonite, or other source of reactive alumina and a sodium compound.

Thus, the initial cryolite material and the reactive alumina are converted to a useful lower ratio cryolite material, with minimal loss of fluorine values, even though some of the original cryolite sodium is lost as soluble sodium sulfate. The net result is an improvement of the $NaF/AlF_3$ ratio.

Where hydrochloric acid is employed as the acid reactant, a sufficient amount is added for example, to a water slurry of alkaline cryolite material, to convert the sodium carbonate content of the Dawsonite to sodium chloride, and to react upon the cryolite material and the reactive alumina in accordance with the hypothetical reaction:

$$2Na_3AlF_6 + Na_2CO_3 \cdot Al_2O_3 + 8HCl$$
$$\rightarrow 4AlF_3 + 8NaCl + CO_2 + 4H_2O \quad (5)$$

By adjustment of the amount of HCl added, the proportion of sodium consumed may be regulated to produce an $NaF/AlF_3$ weight ratio at least as low as 0.8, with a simultaneous decrease in the level of such detrimental impurities as $Na_2CO_3$, $SiO_2$, $Fe_2O_3$, and $Na_2SO_4$. When the pH of the slurry after admixing the acid and allowing time for reaction has reached about 6.0 to 6.5, it is found that most of the fluorine originally present is contained in the insoluble low-ratio cryolite material produced. Any fluorine remaining in the liquid portion of the slurry may be recovered by recirculating the liquor through the process. The amount of such dissolved fluorine can be minimized by using an excess of about 5 to 10% alumina over that required reaction (5).

It is necessary to have the final pH of the slurry within the range of about 4.8 to 6.7 in order to maintain silica in solution while the cryolite precipitates.

Although more costly than sulfuric acid, hydrochloric acid has the advantage of yielding a product with virtually no sulfate impurity.

In the practice of the invention, there are provided two alternative ways of introducing the necessary reactive alumina for reaction with the acid reactant: (1) the alumina in introduced during the preparation of the cryolite material to be treated, as in reaction (1) above, or (2) the alumina is introduced together with the acid reactant, in the form of alumina trihydrate, sodium aluminate, Dawsonite $Na_2CO_3 \cdot Al_2O_3$, or the like.

The acid reactant treatment temperatures ordinarily will be in the range of about 70° to 100° C., preferably about 85° to 90° C.

After the digestion period is completed, the cryolite product is filtered, and may be dried at not more than about 450° C., depending upon the use to which the cryolite is to be put.

The following examples illustrate the practice of the invention, but are not to be regarded as limiting:

EXAMPLE 1

Treatment with HCl 400 g. of cryolite made by reaction of sodium fluoride and sodium aluminate followed by carbonation, and having an $NaF/AlF_3$ ratio of 2.56 (containing 19.2% excess $Al_2O_3$ and 18.8% excess $Na_2CO_3$) was reacted with 2854 ml. of 1 N HCl for 20 minutes after the temperature reached 90° C. and the pH rose from 5.3 to 6.0. The analyses of the untreated and treated cryolite were as follows:

TABLE 1

| Sample | Percent | | | | $NaF/AlF_3$, wt. ratio |
| --- | --- | --- | --- | --- | --- |
| | F | $SiO_2$ | $Fe_2O_3$ | $Na_2SO_4$ | |
| Untreated | 25.86 | 0.49 | 0.12 | 1.42 | 2.56 |
| Treated | 41.75 | 0.12 | 0.04 | 0.31 | 0.89 |

EXAMPLE 2

Treatment with H₂SO₄

400 g. of synthetic cryolite prepared as in Example 1 and containing 20% excess $Al_2O_3$ and 20% excess $Na_2CO_3$ was reacted with 2964 ml. of 1 N $H_2SO_4$ for 20 minutes after the temperature reached 90° C., the pH rising from 5.3 to about 6.0. The comparative analyses of untreated and treated samples was:

TABLE 2

| Sample | Percent | | | | $NaF/AlF_3$, wt. ratio |
| --- | --- | --- | --- | --- | --- |
| | F | $SiO_2$ | $Fe_2O_3$ | $Na_2SO_4$ | |
| Untreated | 26.05 | 0.46 | 0.15 | 1.51 | 2.66 |
| Treated | 41.25 | 0.16 | 0.12 | 3.23 | 0.70 |

Time studies showed that the percentage of fluoride in the filtrate reached its lowest value at the end of 20 minutes, remaining steady through 30 minutes of treatment.

EXAMPLE 3

Treatment with AlCl₃

50 g. of essentially neutral cryolite was prepared, substantially free of excess alumina, and mixed with 31.75 g. aluminum chloride and then with 750 ml. water. The mixture reached a temperature of about 95° C. within 5 minutes, after which 15 g. NaOH was added and the batch digested for 30 minutes. The reaction mixture was filtered, and the filtrate was found to have a pH of 5.9. The precipitated cryolite material contained 30.24% excess $AlF_3$ (corresponding to an $NaF/AlF_3$ weight ratio of approximately 0.7).

The same procedure was repeated using Greenland cryolite, and the resulting filtrate had a pH of 6.3, with the product containing 29.4% excess $AlF_3$.

This application is a companion of Vancil and Harrison applications Ser. No. 596,087 and Ser. No. 596,057 both filed Nov. 22, 1966 dealing with other methods of beneficiating cryolite material, by treatment respectively with fluorine-containing acid reactants such as HF, or with fluosiliceous acid reactants; and the contents of such applications are incorporated herein by reference.

Reference likewise is made to Vancil and Harrison applications Ser. No. 596,088 and Ser. No. 596,236 both filed Nov. 22, 1966 and dealing, respectively, with a method of producing cryolite material by direct precipitation, and a method of producing beneficiated cryolite material to compensate for reduction cell losses.

While the presently preferred practices of the invention have been described, it will be apparent that the invention may be otherwise variously embodied and practiced within the scope of the following claims.

What is claimed is:

1. Method of lowering the $NaF/AlF_3$ weight ratio of cryolite material to a value less than 1.5 to 1, which comprises reacting said cryolite material in the presence of reactive alumina with an acid reactant selected from the group consisting of hydrochloric, sulfuric, nitric, sulfurous and hypochlorous acids, and the aluminum salts of such acids, the amount of reactive alumina being sufficient to adjust the Na:Al molar ratio of said cryolite material to less than 3:1, and the amount of acid reactant being sufficient to convert at least a portion of said reactive alumina into cryolite material comprising excess aluminium fluoride.

2. The method of claim 1 in which the initial cryolite material comprises an alkaline synthetic cryolite.

3. The method of claim 1 in which the initial cryolite material comprises a synthetic cryolite containing reactive alumina and sodium carbonate.

4. The method of claim 1 in which the acid reactant is hydrochloric acid.

5. The method of claim 1 in which the acid reactant is sulfuric acid.

6. The method of claim 1 in which the acid reactant is aluminum chloride.

7. The method of claim 4 in which the reaction proceeds to a final pH of about 6.0 to 6.5.

8. The method of claim 1 in which the reaction proceeds to a final pH of about 4.8 to 6.7.

9. The method of claim 1 in which the reactive alumina is introduced together with the acid reactant.

10. The method of claim 1 in which the reactive alumina is introduced during the preparation of the initial cryolite material.

11. The method of claim 1 in which the reaction temperature is between about 70° and 100° C.

References Cited

UNITED STATES PATENTS

| 2,186,433 | 1/1940 | Schwemmer | 23—88 |
| 3,049,405 | 8/1962 | Trupiano | 23—88 |
| 3,128,151 | 4/1964 | Zanon et al. | 23—88 |

FOREIGN PATENTS

| 649,818 | 9/1937 | Germany. |

EDWARD STERN, Primary Examiner

U.S. Cl. X.R.

23—89, 121, 150